United States Patent [19]
Kojima et al.

[11] Patent Number: 6,157,098
[45] Date of Patent: Dec. 5, 2000

[54] FEED LINE CONNECTION CIRCUIT AND OPTICAL TRANSMISSION SYSTEM

[75] Inventors: Junichi Kojima; Kenichi Asakawa; Koji Goto; Toshio Kawazawa; Koh-ichi Tatekura; Etsuo Nazuka, all of Tokyo, Japan

[73] Assignees: KDD Corporation; KDD Submarine Cable Systems, Inc., both of Tokyo, Japan

[21] Appl. No.: 09/217,172

[22] Filed: Dec. 21, 1998

[30] Foreign Application Priority Data

Dec. 19, 1997 [JP] Japan .................................. 9-350350

[51] Int. Cl.$^7$ .................................................. H01H 47/22
[52] U.S. Cl. ......................... 307/139; 307/113; 361/191
[58] Field of Search .................................. 307/139, 130, 307/131, 113, 115; 361/191

[56] References Cited

U.S. PATENT DOCUMENTS

| | | | |
|---|---|---|---|
| 5,196,984 | 3/1993 | Webb | 361/191 |
| 5,491,368 | 2/1996 | Yamamoto | 307/113 |
| 5,644,466 | 7/1997 | Ohta et al. | 361/191 |

FOREIGN PATENT DOCUMENTS

2 287 625   9/1995   United Kingdom .

*Primary Examiner*—Josie Ballato
*Assistant Examiner*—Robert L. Deberadinis
*Attorney, Agent, or Firm*—Christie, Parker & Hale, LLP

[57] ABSTRACT

A feed line connecting circuit for selectively connecting first, second and third feed line connecting terminals under a predetermined current feeding condition comprises a first current detector connected between one of the first and second feed line connecting terminals and a central node for detecting a current over a predetermined value; a first switch connected between the one of the first and second feed line connecting terminals and the central node for connecting said one of the first and second feed line connecting terminals to the central node under an unpowered condition; a selective switch controlled by the first current detector, the selective switch having first and second contacts and a common contact connected to the third feed line connecting terminal, the common contact being connected to the first selective contact when the first current detector does not detect a current over the predetermined value, and to the second selective contact when the first current detector detects a current over the predetermined value; and a second current detector connected between the first selective contact of the selective switch and the central node to change the first switch so as to disconnect said one of the first and second feed line connecting terminals from the central node when detecting a current above the predetermined value.

12 Claims, 8 Drawing Sheets

FEED LINE CONNECTION CIRCUIT AND OPTICAL TRANSMISSION SYSTEM

FIELD OF THE INVENTION

This invention relates to a feed line connecting circuit, more particularly to a circuit for connecting power feeding lines, especially suitable for use in a branching unit of an optical fiber transmission system.

The invention also relates to an optical transmission system of a double branching type using the feed line connecting circuit.

BACKGROUND OF THE INVENTION

Branching units of optical fiber transmission systems, particularly sea branching units of submarine fiber transmission systems, use a feed line, which has three connection terminals A, B and C, and can connect the power feeding lines between trunks or between a trunk and a branch as desired by connecting two terminals. Since power can be supplied to other power feeding lines connected to the last terminal independently from power feeding lines connected to the former two of terminals by connecting the last terminal to ground, the circuit typically has a circuit arrangement that can selectively connect terminals B and C to ground.

Figure 4:
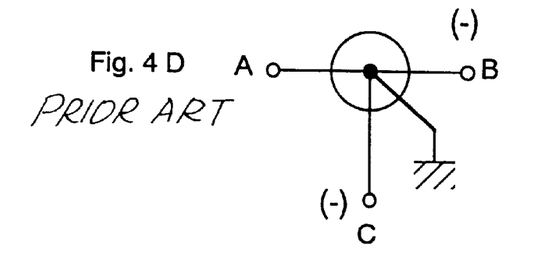
FIGS. 4A through 4D are diagrams showing different connected configurations of a conventional feed line connecting circuit.
Figure 4A:
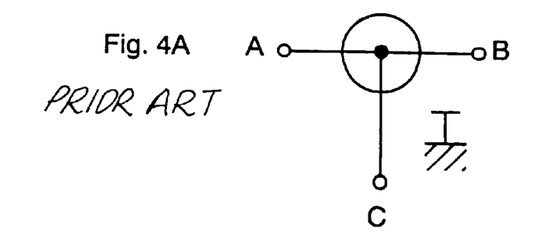
Figure 4B:
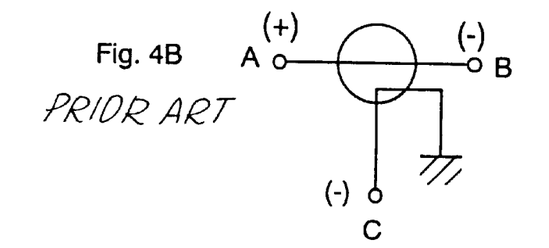
Figure 4C:
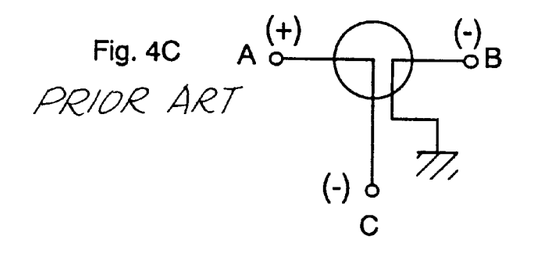

FIGS. 4A through 4D show aspects of connection of a conventional feed line connecting circuit. FIG. 4A shows an upowered condition, FIG. 4B shows the condition where the terminal A and the terminal B are connected, FIG. 4C shows the condition where the terminal A and the terminal C are connected, and FIG. 4D shows the condition where the terminals B and C are connected to ground. In FIGS. 4B through 4D, signs (+) and (−) show relative potentials. By establishing any of these potential conditions, a desired configuration of connection is selected.

Under the unpowered condition shown in FIG. 4A, terminals A, B and C are usually connected to each other and float from ground to permit an insulation electric test. Due to a current flowing from the terminal A to the terminal B, which applies a plus potential to the terminal A and a minus potential to the terminal B, the terminal C is disconnected from the terminals A and B and connected to ground as shown in FIG. 4B, and this state of connection is maintained. When a plus potential is applied to the terminal A while a minus potential is applied to the terminal C, the terminal B is disconnected from the terminals A and C and connected to ground as shown in FIG. 4C, and this state of connection is maintained. When a minus potential is applied to both terminals B and C, all terminals A, B and C result in being connected to ground as shown in FIG. 4D.

As shown in FIGS. 4B and 4C, the conventional feed line connecting circuit is configured to always connect one or more of out-of-use feed line connecting terminals to ground.

Figure 5:
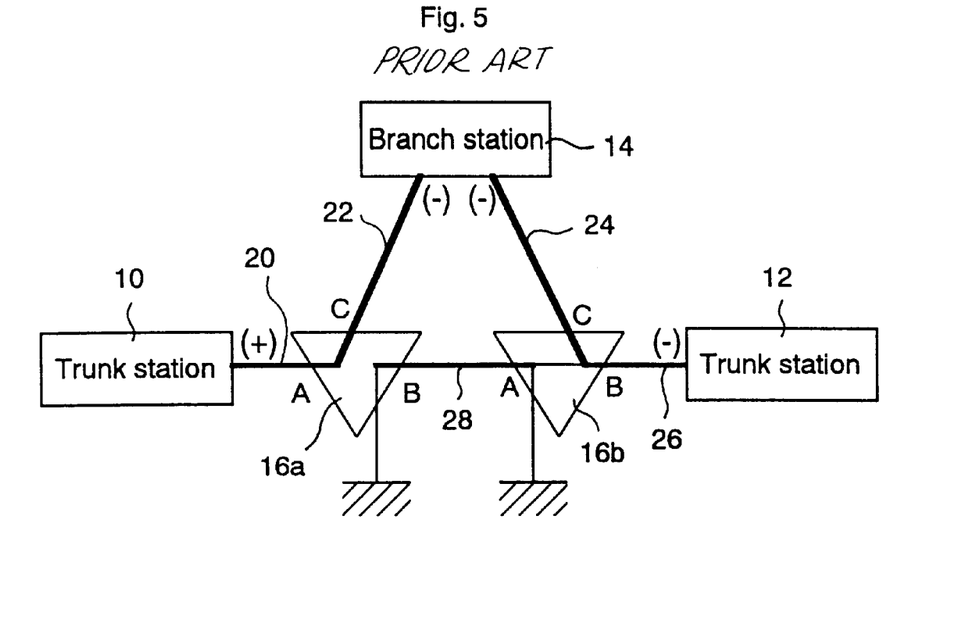
FIG. 5 is a diagram of a double branching power feeding system using a conventional feed line connecting circuit.

In recent submarine optical fiber transmission systems in which optical fiber cables are connected in form of a ring, a double branching system connecting two branching units to each branch station has been proposed to increase the reliability of the branch station. FIG. 5 is a block diagram schematically showing the construction of a double branching type of power feeding system. Reference numerals 10 and 12 denote trunk stations, 14 is a branch station, and 16a and 16b are (feed line connecting circuits of) branching units. A power feeding line 20 connects the trunk station 10 to the feed line connecting terminal A of the branching unit 16a, and a power feeding line 22 connects the feed line connecting terminal C of the branching unit 16a to the branch station 14. The power feeding line 24 connects the branch station 14 to the feed line connecting terminal C of the branching unit 16b, and the power feeding line 26 connects the feed line connecting terminal B of the branching unit 16b to the trunk station 12. A power feeding line 28 connects the feed line connecting terminal B of the branching unit 16a to the feed line connecting terminal A of the branching unit 16b.

Since the branching units 16a, 16b are installed in relatively short distances around 20 km, the trunk cables used there are usually configured for non-repeated transmission, and need no power source. In FIG. 5, the feed line connecting circuit of the branching unit 16a is in the condition of FIG. 4B where the feed line connecting terminals A and C are connected, rendering the trunk station 10 in a plus potential and the branch station 14 in a minus potential, and power is supplied to the power feeding lines 20 and 22 between the trunk station 10 and the branch station 14. The feed line connecting circuit of the branching unit 16b is in the state of FIG. 4D where all feed line connecting terminals A, B and C are connected to ground, rendering both the branch station 14 and the trunk station 12 in a minus potential, and the power feeding lines 20, 22 are supplied with power independently. The power feeding line 28 are connected to sea grounds at opposite ends thereof.

When the power feeding line 28 is grounded at both ends thereof to sea grounds, a loop current flows due to a difference in potential between the grounds, and the current invites corrosion of the anode side ground electrode.

Figure 6:
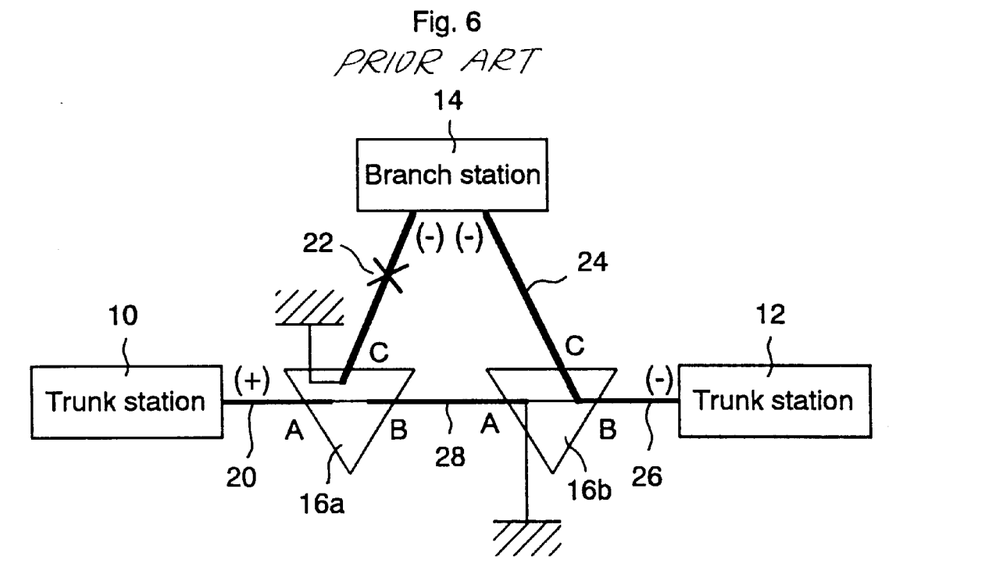
FIG. 6 is a diagram of a power feeding system established upon breakage of a power feeding line 22.

Moreover, when the power feeding line 22 breaks and becomes electrically open, the feed line connecting circuit of the branching unit 16a changes to the configuration shown in FIG. 4B where the feed line connecting terminals A and B are connected to each other, and the power feeding system exhibits the configuration shown in FIG. 6. That is, the power feeding line 20 connects to the power feeding line 28, and falls to ground at the feed line connecting terminal A of the branching unit 16b. In the feed line connecting circuit of the branching unit 16a, a large current flows when connection of the feed line connecting terminal B changes from ground to the feed line connecting terminal A, and may damage the relay circuit in which the current flows.

SUMMARY OF THE INVENTION

It is therefore an object of the invention to provide a feed line connecting circuit and an optical transmission system overcoming the problems explained above.

Another object of the invention is to provide a feed line connecting circuit not inviting the above-explained problems even in a double branching system.

A further object of the invention is to provide a feed line connecting circuit capable of holding an out-of-use feed line connecting terminal floating from ground or terminated at a resistor in a specific state of connection.

In a feed line connecting circuit according to the invention, connected between one of first and second feed line connecting terminals and a central node are a first current detector for detecting a current above a predetermined value and a first switch for connecting one of the first and second feed line connecting terminals to the central node in the unpowered condition. There is further provided a selective switch for connecting a common contact to a first selective contact when the first current detector does not detect any current above the predetermined value, and for connecting the common contact to a second selective contact when the first current detector detects a current above the predetermined value. The common contact of the selective switch connects to a third feed line connecting terminal. Between the first selective contact of the selective switch and the central node is connected a second current detector for switching the first switch so as to disconnect said one of the first and second feed line connecting terminals from the central node when detecting a current above the predetermined value.

In the arrangement, all of the first, second and third feed line connecting terminals are connected in the unpowered condition. When a current flows between the first (or second) feed line connecting terminal and the third feed line connecting terminal, the first switch is switched by the second current detector, and the second (or first) feed line connecting terminal is disconnected from the central node. At that time, the second (or first) feed line connecting terminal can be floated from ground by floating the contact of the first switch, and it can be terminated in a resistor by connecting the contact of the first switch to ground via the resistor.

When a current flows between the first feed line connecting terminal and the second feed line connecting terminal, the third feed line connecting terminal is disconnected from the central node by the selective switch. In the case where the second selective contact of the selective switch is connected to ground directly or via a resistor, power can be supplied to a power feeding line connected to the third feed line connecting terminal independently from power feeding lines connected to the first and second feed line connecting terminals.

By connecting the first current detector and the first switch between the first feed line connecting terminal and the central node, the first feed line connecting terminal can be disconnected from the central node when a current flows between the second feed line connecting terminal and the third feed line connecting terminal.

By connecting the first current detector and the first switch between the second feed line connecting terminal and the central node, the second feed line connecting terminal can be disconnected from the central node when a current flows between the first feed line connecting terminal and the third feed line connecting terminal.

A third current detector is connected between the second selective contact of the selective switch and ground; a normally closed second switch, which is open when the third current detector detects a current above a predetermined value, is connected between the first selective contact of the selective switch and the central node; and a normally open third switch, which is closed when the third current detector detects a current above the predetermined value, is connected between the common contact and the second selective contact of the selective switch. As a result, when the selective switch connects at the second selective contact due to a current flowing between the first feed line connecting terminal and the second feed line connecting terminal, it can be self-maintained to connect the third feed line connecting terminal to ground. The use of the second switch contributes to reliable disconnection of the third feed line connecting terminal connected to ground from the central node. Even if the selective switch changes the connection to the first selective contact, the third feed line connecting terminal is maintained in the status disconnected from the central node.

By connecting a resistor between the first selective contact of the selective switch and the central node and connecting, in parallel with the resistor, a fourth switch closed by the second current detector when a current above the predetermined value flows in the second current detector, the first feed line connecting terminal and the second feed line connecting terminal can be connected reliably even if any short-circuiting trouble occurs at the third feed line connecting terminal.

By connecting a bypass circuit in parallel with each of the first, second and third current detectors to bypass a current in a predetermined direction, the above switches can be prevented from unintentional activation by a reverse current. The bypass circuit may comprise a Zener diode, for example.

In an optical transmission system connecting a branch station to a trunk optical line via the first and second branching units, opposite ends of a power feeding line between the first and second branching units are held floating from ground or connected to ground via a resistor. Then, it is prevented that a large current flows in the power feeding line between the branching units even when breakage of any power feeding line, for example, causes unintentional changes in connected configuration of power feeding lines in the first or second branching unit which may cause the power feeding line between the first and second branching units to be incorporated into the power feeding system. Additionally, by maintaining the opposite ends of the power feeding line between the branching units, a loop current does not flow in the power feeding line between the first and second branching units in the normal status, and therefore, corrosion of the electrode by loop current can be prevented.

BRIEF DESCRIPTION OF THE DRAWINGS

FIGS. 2A through 2C are diagrams showing different connected configurations of a branching unit 36a;

DESCRIPTION OF THE PREFERRED EMBODIMENTS

Embodiments of the invention are explained below in detail with reference to the drawings.

Figure 1:
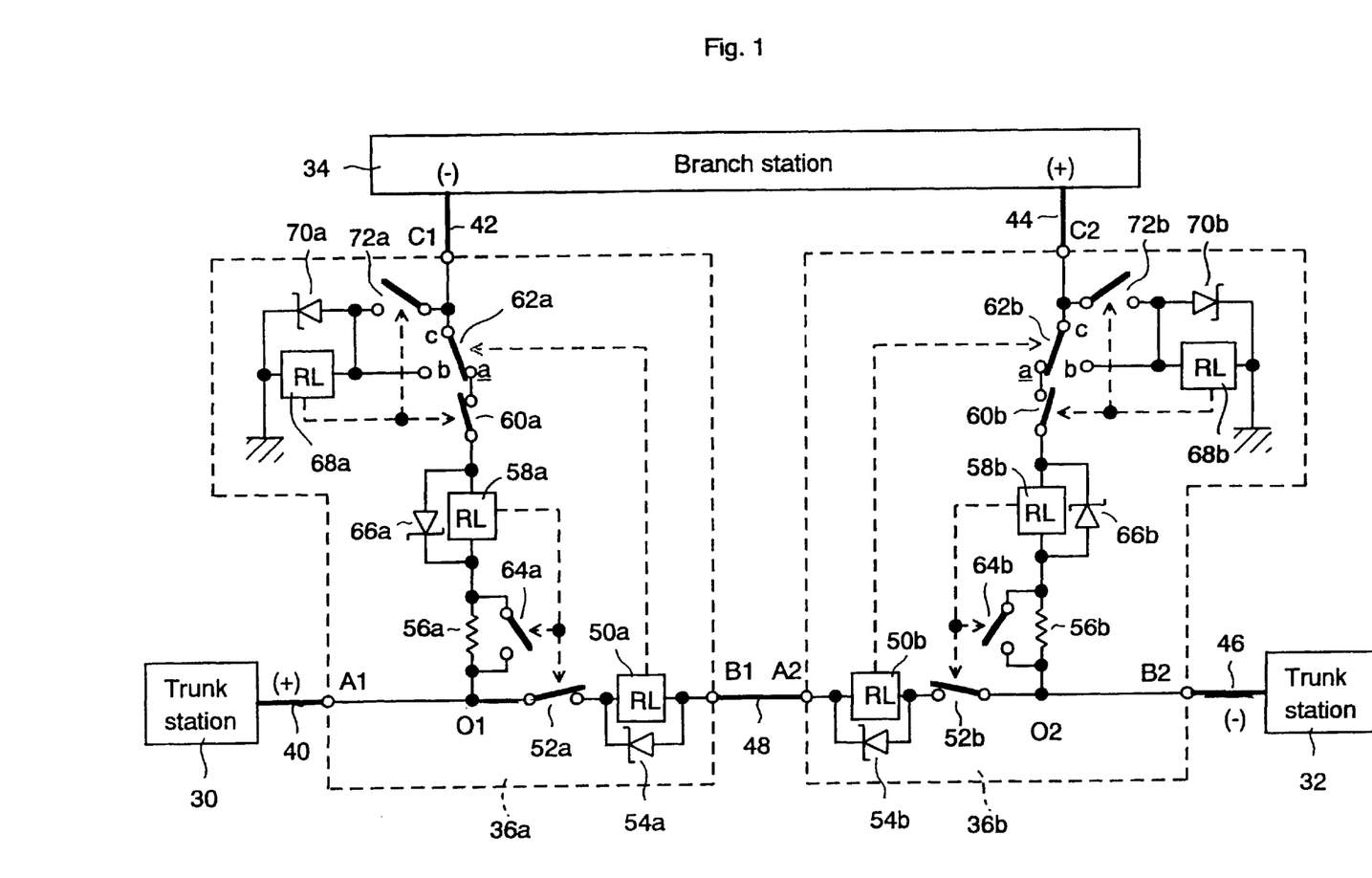
FIG. 1 is a schematic block diagram generally showing an embodiment of the invention.

FIG. 1 is a schematic block diagram showing a general arrangement of a double branching optical transmission system employing an embodiment of the invention. Numerals 30, 32 denote trunk stations, 34 is a branch station, and 36a and 36b are (feed line connecting circuits of) branching units which connect the branch station 34 to a trunk cable between the trunk stations 30 and 32. A power feeding line 40 connects the trunk station 30 to a feed line connecting terminal A1 of the branching unit 36a, and a power feeding line 42 connects a feed line connecting terminal C1 of the branching unit 36a to the branch station 34. A power feeding line 44 connects the branch station 34 to a feed ling connecting terminal C2 of the branching unit 36b, and a power feeding line 46 connects a feed line connecting terminal B2 of the branching unit 36b to the trunk station 32. A power feeding line 48 connects a feed line connecting terminal B1 of the branching unit 36a to a feed line connecting terminal A2 of the branching unit 36b.

Explained below is construction of the feed line connecting circuit of the branching unit 36a. The feed line connecting terminal A1 is in direct connection to a central node O1, and the feed line connecting terminal B1 connects to the central node O1 via a relay circuit 50a and a normally closed switch 52a. A Zener diode 54a is connected in parallel with the relay circuit 50a to bypass a current flowing in the direction from the feed line connecting terminal B1 toward the central node O1. The central node O1 is connected also to the feed line connecting terminal C1 via a resistor 56a for preventing damage due to short circuit, a relay circuit 58a, a normally closed switch 60a, and a selective contact a and a common contact c of a switch 62a. A normally open switch 64a is connected in parallel with the resistor 56a. A Zener diode 66a is connected in parallel with the relay circuit 58a to bypass a current in the direction from the terminal C1 toward the central node O1.

The switch 62a has two selective contacts a and b and a common contact c, and the common contact c normally connects to the selective contact a. The selective contact a of the switch 62a connects to the switch 60a whereas the common contact c connects to the feed line connecting terminal C1. The selective contact b of the switch 62a is connected to ground through the relay circuit 68a. A Zener diode 70a is connected in parallel with the relay circuit 68a to bypass a current flowing from the selective contact b of the switch 62a toward ground. Further connected between the common contact c (i.e., the feed line connecting terminal C1) and the selective contact b of the switch 62a is a normally open switch 72a.

The switch 62a is controlled by the relay circuit 50a to change its connection. More specifically, the relay circuit 50a connects the switch 62a to the selective contact a during no substantial flow of current, and changes connection of the switch 62a to the selective contact b when a current above a predetermined value flows. The relay circuit 58a is configured to open the switch 52a and close the switch 64a when a current above a predetermined value flows. The relay circuit 68a is configured to open the normally closed switch 60a and close the normally open switch 72a when a current over a predetermined value flows.

Even when a current flows in a predetermined direction in each of the relay circuits 50a, 58a and 68a, potential differences in the relay circuits 50a, 58a and 68a are respectively limited due to breakdown voltages of the Zener diodes 54a, 66a and 70a connected in parallel with them. That is, the Zener diodes 54a, 66a and 70a prevent excessive current flow in the relay circuits 50a, 58a and 68a.

When power is supplied to circuit elements in the branching unit 36a, a resistor is connected between the feed line connecting terminal A1 and the central node O1 to generate a source voltage from a voltage drop of the resistor and to supply power to the circuit required.

Figure 2A:
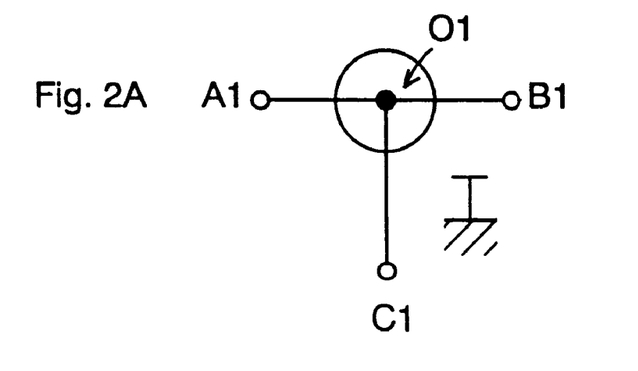
Figure 2B:
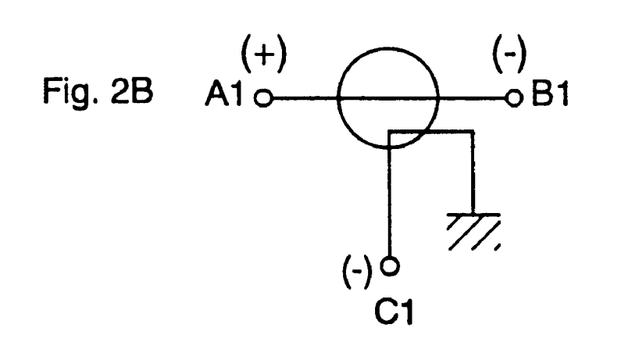
Figure 2C:
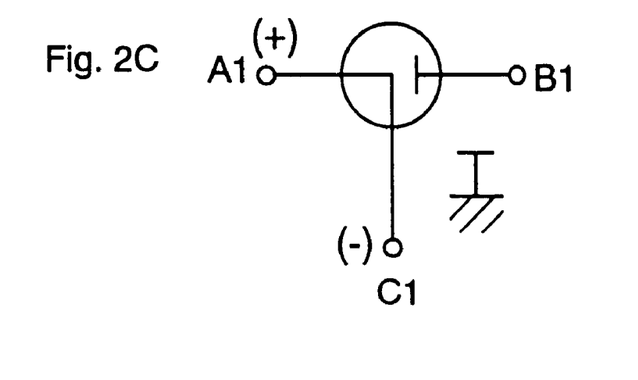

Next explained are behaviors of the feed line connecting circuit in the branching unit 36a. Different configurations of connection are shown in FIGS. 2A through 2C, in which FIG. 2A shows an unpowered condition, FIG. 2B shows A-B connecting condition where the feed line connecting terminals A1 and B1 are connected to each other, and FIG. 2C shows A-C connecting conditions where the feed line connecting terminal A1 and C1 are connected to each other. The embodiment shown here cannot realize the status corresponding to FIG. 4D where all of the feed line connecting terminals A1, B1 and C1 are connected to ground.

It will be understood from FIG. 1 that, in the unpowered condition, since the switches 52a and 60a are closed and the switch 62a connects at the selective contact a, all of the feed line connecting terminals A1, B1 and C1 result in connecting with each other at the central node O1. That is, the connecting configuration shown in FIG. 2A is established.

When it is desired to make the connecting configuration shown in FIG. 2B, a plus potential is applied to the feed line connecting terminal A1 whereas a minus potential is applied to the feed line connecting terminal B1. Then, a current flows from the feed line connecting terminal A1 toward the feed line connecting terminal B1. Since this direction is the reverse direction for the Zener diode 54a, an amply large current flows in the relay circuit 50a, and the relay circuit 50a changes connection of the switch 62a to the selective contact b. However, the current flowing in the relay circuit 50a is limited by the breakdown voltage of the Zener diode 54a. As a result, the feed line connecting terminal C1 is disconnected from the central node O1, and connected to ground through the selective contact b of the switch 62a and the relay circuit 68a. This is just the status shown in FIG. 2B.

If the feed line connecting terminal C1 exhibits a minus potential relative to ground, then a current flows in the relay circuit 68a, and the relay circuit 68a opens the switch 60a and closes the switch 72a. As a result of the closure of the switch 72a, the feed line connecting terminal C1 is connected to ground via the switch 72a and the relay circuit 68a and self-maintained in the connection to ground, being unrelated to the connecting status of the switch 62a. In this status, similarly to the conventional circuit, it is possible to flow a source current in the power feeding line connected to the feed line connecting terminal C1 independently from power feeding lines connected to the feed line connecting terminals A1 and B1.

If the feed line connecting terminal C1 exhibits a plus potential relative to ground, then a current from the feed line connecting terminal C1 toward ground flows in the Zener diode 70a, and a current required does not flow in the relay circuit 68a. As a result, the switch 72a is held open, and the switch 60a is held closed. Even then, as long as the a current flows in the relay circuit 50a, the switch 62a connects to the selective contact b, and the feed line connecting terminal C1 is disconnected from the central node O1 and connects to ground. Therefore, similarly to the case where a minus potential appears at the feed line connecting terminal C1, a source current can be flown in the power feeding line connected to the feed line connecting terminal C1 independently from power feeding lines connected to feed line connecting terminals A1 and B1. In this case however, when the potential at the feed line connecting terminal B1 rises, and a sufficient current does not flow in the relay circuit 50a, connection of the switch 62a changes to the selective contact a, and results in the feed line connecting terminal C1 being connected to the central node O1.

Since the resistor 56a is inserted between the central node O1 and the feed line connecting terminal C1, even if the feed line connecting terminal C1 is short-circuited, the connection configuration shown in FIG. 2B can be established by applying a potential of the above-mentioned polarity between the feed line connecting terminals A1 and B1.

When the configuration shown in FIG. 2C is desired, a plus potential is applied to the feed line connecting terminal A1 and a minus potential is applied to the feed line connecting terminal C1 from the unpowered condition. Under the unpowered condition, the switch 60a closes, and the switch 62a connects at the selective contact a. Therefore, a current flows from the feed line connecting terminal A1 to the feed line connecting terminal C1 through the resistor 56a, relay circuit 58a, switch 60a, selective contact a and common contact c of the switch 62a. Because a current over a predetermined value flows in the relay circuit 58a, the switch 64a closes and the switch 52a opens. Because the switch 52a opens, the feed line connecting terminal B1 is disconnected from the central node O1. Because the switch 64a closes, the resistor 56a is bypassed, and useless voltage drop does not occur.

Explained below is the construction of the feed line connecting circuit of the branching unit 36b. The feed line connecting circuit is basically similar to that of the branching unit 36a, and its components 50b through 72b correspond to the components 50a through 72a of the branching unit 36a, and they are different in the following points. That is, in the branching unit 36a, the relay circuit 50a, switch 52a and Zener diode 54a are connected between the feed line connecting terminal B1 and the central node O1. In the branching unit 36b, similar relay circuit 50b, switch 52b and Zener diode 54b are connected between the feed line connecting terminal A2 and the central node O2, and the feed line connecting terminal B2 directly connects to the central node O2. The zener diode 54b is connected in orientation to bypass the relay circuit 50b in the direction from the central node O2 to the feed line connecting terminal A2. The Zener diode 66b is connected in orientation to make a current from the central node O2 toward the feed line connecting terminal C2 to bypass the relay circuit 58b.

Also in the feed line connecting circuit of the branching unit 36b, functions of the Zener diodes 54b, 66b and 70b are like those of the Zener diodes 54a, 66b and 70a, and they prevent that any excessive current flows into the relay circuits 50b, 58b and 68b.

Figure 3A:
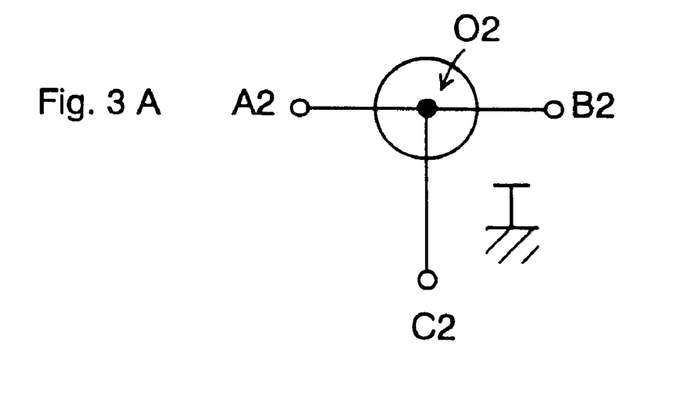
FIGS. 3A through 3C are diagrams showing different connected configurations of a branching unit 36b.
Figure 3B:
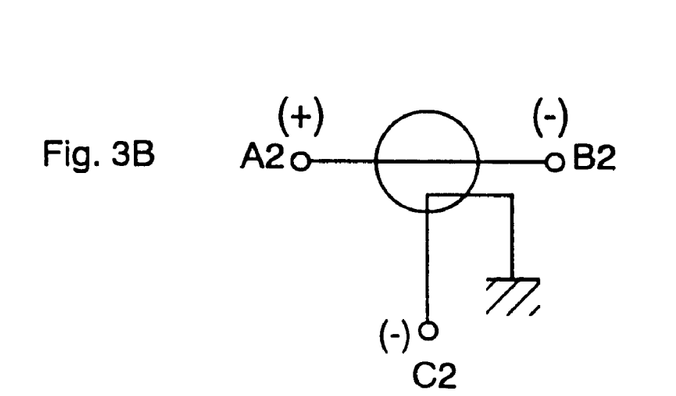
Figure 3C:
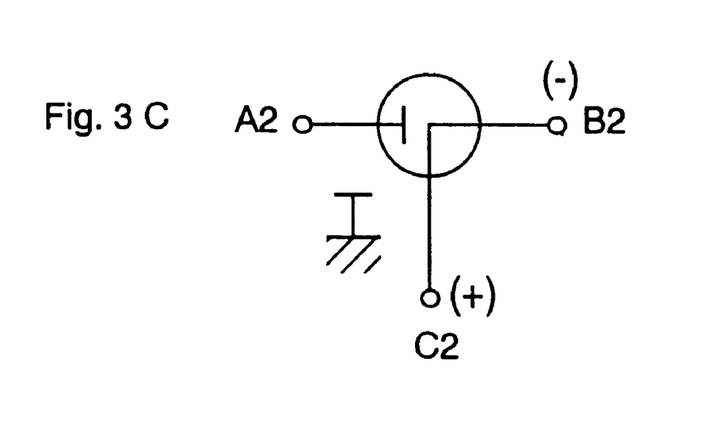

Next explained are behaviors of the feed line connecting circuit of the branching unit 36b. Different configuration of connection are shown in FIGS. 3A through 3C, in which FIG. 3A shows an unpowered condition, FIG. 3B shows A-B connecting condition where the feed line connecting terminals A2 and B2 are connected to each other, and FIG. 3C shows A-C connecting condition where the feed line connecting terminal A2 and C2 are connected to each other. The embodiment shown here cannot realize the status corresponding to FIG. 4D where all of the feed line connecting terminals A2, B2 and C2 are connected to ground.

It will be understood from FIG. 1 that, in the unpowered condition, since the switches 52b and 60b are closed and the switch 62b connects at the selective contact a, all of the feed line connecting terminals A2, B2 and C2 result in connecting with each other at the central node O2. That is, the connecting configuration shown in FIG. 3A is established.

When it is desired to make the connecting configuration shown in FIG. 3B, a plus potential is applied to the feed line connecting terminal A2 whereas a minus potential is applied to the feed line connecting terminal B2. Then, a current flows from the feed line connecting terminal A2 toward the feed line connecting terminal B2. Since this direction is the opposite direction for the Zener diode 54b, an amply large current flows in the relay circuit 50b, and the relay circuit 50b changes connection of the switch 62b to the selective contact b. However, the current flowing in the relay circuit 50b is limited by the breakdown voltage of the Zener diode 54b. As a result, the feed line connecting terminal C2 is disconnected from the central node O2, and connected to the earth through the selective contact b of the switch 62a and the relay circuit 68b. This is just the status shown in FIG. 3B.

If the feed line connecting terminal C2 exhibits a minus potential relative to ground, then a current flows in the relay circuit 68b, and the relay circuit 68b opens the switch 60b and closes the switch 72b. As a result of the closure of the switch 72b, the feed line connecting terminal C2 is connected to ground via the switch 72b and the relay circuit. 68b and self-maintained in the connection to ground, being unrelated to the connecting status of the switch 62b. In this status, similarly to the conventional circuit, it is possible to flow a source current in the power feeding line connected to the feed line connecting terminal C2 independently from power feeding lines connected to the feed line connecting terminals A2 and B2.

If the feed line connecting terminal C2 exhibits a plus potential relative to ground, then a current from the feed line connecting terminal C2 toward ground flows in the Zener diode 70b, and a current required does not flow in the relay circuit 68b. As a result, the switch 72b is held open, and also the switch 60b is held closed. Even then, as long as the a current flows in the relay circuit 50b, the switch 62b connects to the selective contact b, and the feed line connecting terminal C2 is disconnected from the central node O2 and connects to ground. Therefore, similarly to the case where a minus potential appears at the feed line connecting terminal C2, a source current can be flown in the power feeding line connected to the feed line connecting terminal C2 independently from power feeding lines connected to feed line connecting terminals A2 and B2. In this case however, when the potential at the feed line connecting terminal B2 rises, and a sufficient current does not flow in the relay circuit 50b, connection of the switch 62b changes to the selective contact a, and results in the feed line connecting terminal C2 being connected to the central node O2.

Since the resistor 56b is inserted between the central node O2 and the feed line connecting terminal C2, even if the feed line connecting terminal C2 is short-circuited, the connection configuration shown in FIG. 3B can be established by applying a potential of the above-mentioned polarity between the feed line connecting terminals A2 and B2.

When the configuration shown in FIG. 3C is desired, a plus potential is applied to the feed line connecting terminal C2 and a minus potential is applied to the feed line connecting terminal B2 from the unpowered condition. Under the unpowered condition, the switch 60b closes, and the switch 62b connects at the selective contact a. Therefore, a current flows from the feed line connecting terminal C2 to the feed line connecting terminal B2 through the common contact c and selective contact a of the switch 62b, switch 60b, relay circuit 58b and resistor 56b. Because a current over a predetermined value flows in the relay circuit 58b, the switch 64b closes and the switch 52b opens. Because the switch 52b opens, the feed line connecting terminal A2 is disconnected from the central node O2. Because the switch 64b closes, the resistor 56b is bypassed, and useless voltage drop does not occur.

In this manner, in the embodiment shown here, the feed line connecting terminal B1 of the branching unit 36a and the feed line connecting terminal A2 of the branching unit 36b can be disconnected from the central nodes O1 and O2 under floating from ground.

For example, in the case where the power feeding lines 40 and 42 are connected (that is, the feed line connecting terminals A1 and C1 are connected as shown in FIG. 2C) in the branching unit 36a whereas the power feeding lines 44 and 46 are connected (that is, the feed line connecting terminals C2 and B2 are connected as shown in FIG. 3C) in the branching unit 36b, opposite ends of the power feeding line 48 become floating from ground. In this status, if the power feeding line 42 breaks, for example, no current flows in the relay circuit 58a in the branching unit 36a. Therefore, the switch 52a closes, and the feed line connecting terminal B1 is connected to the central node O1, i.e. the feed line connecting terminal A1. However, since the power feeding line 48 connected to the feed line connecting terminal B1 of the branching unit 36a floats from ground at its other end (the feed line connecting terminal A2 of the branching unit 36b), no current flows in the relay circuits 50a and 50b.

Additionally, since the power feeding line 48 is floating from ground at both ends thereof, no loop current flows, and the problem of corrosion of the anode-side earth electrode is also removed.

Although the branching unit 36a has been explained as connecting the selective contact b of the switch 62a to the earth via the parallel circuits of the relay circuit 68a and the Zener diode 70a; however, the selective contact b may be directly connected to ground. In this case, the switch 60a always maintains connection, and it becomes substantially useless. The same applies also to the switch 62b, relay circuit 68b, Zener diode 70b and switch 60b of the branching unit 36b.

In the branching unit 36a in the embodiment shown above, the switch 52a has been explained as being opened by the relay circuit 58a; however, equivalent effects can be obtained also by replacing it with a switch which connects the feed line connecting terminal B1 to the central node O1 in the normal state (when no current flows in the relay circuit 58a) and connects the feed line connecting terminal B1 to ground via a large resistor when a current over a predetermined value flows in the relay circuit 58a. That is, when the feed line connecting terminals A1 and C1 are connected to each other, the problems involved in the conventional circuit can be removed even by connecting the feed line connecting terminal B1 to ground via a large resistor. The same applies also to the branching unit 36b.

Figure 7:
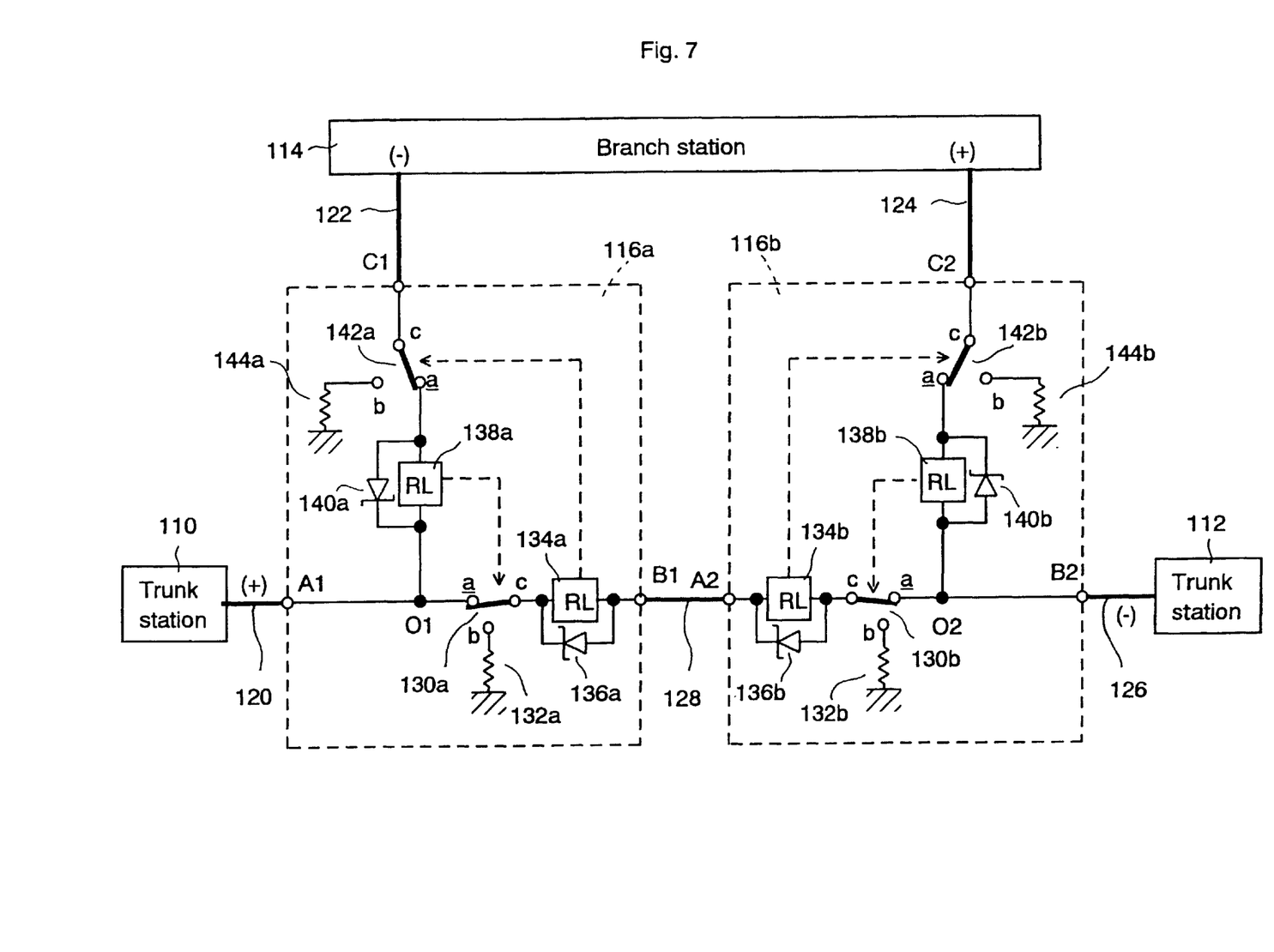
FIG. 7 is a block diagram generally showing a second embodiment of the invention.

Next explained is the second embodiment of the invention. FIG. 7 is a schematic block diagram showing a general construction of a power feeding system according to the second embodiment. Numerals 110 and 112 denote trunk stations, 114 is a branch station, 116a and 116b are (feed line connecting circuits of) branching units which connect the branch station 114 to a trunk cable between the trunk stations 110 and 112. A power feeding line 120 connects the trunk station 110 to a feed line connecting terminal A1 of the branching unit 116a, and a power feeding line 122 connects a feed line connecting terminal C1 of the branching unit 116a to the branch station 114. A power feeding line 124 connects the branch station 114 to a feed line connecting terminal C2, and a power feeding line 126 connects a feed line connecting terminal B2 of the branching unit 116b to the trunk station 112. A power feeding line 128 connects a feed line connecting terminal B1 of the branching unit 116a to a feed line connecting terminal A2 of the branching unit 116b.

Construction of the feed line connecting circuit of the branching unit 116a is explained below. The feed line connecting terminal A1 directly connects to a central node O1 which connects to a selective contact a of a selective switch 130a. A selective contact b of the selective switch 130a connects to ground through a resistor 132a, and a common contact c of the selective switch 130a connects to the feed line connecting terminal B1 via parallel circuits of a relay circuit 134a and a Zener diode 136a. The selective switch 130a normally contacts at the selective contact a. The Zener diode 136a is so connected that the direction from the feed line connecting terminal B1 toward the central node O1 be forward.

The central node O1 also connects to a selective contact a of a selective switch 142a via parallel circuits of a relay circuit 138a and a Zener diode 140a. A selective contact b of the selective switch 142a connects to ground through a resistor 144a, and a common contact c of the selective switch 142a connects to the feed line connecting terminal C1. The selective switch 142a normally connects at the selective contact a. The Zener diode 140a is so connected that the direction from the feed line connecting terminal C1 toward the central node O1 be forward.

The relay circuit 134a changes connection of the selective switch 142a to the selective contact b when a current above a predetermined value flows. The relay circuit 138a changes connection of the selective switch 132a to the selective contact b when a current above the predetermined value flows.

Even when a current in the predetermined direction flows in the relay circuits 134a and 138a, respectively, the potential difference in the relay circuits 134a and 138a is limited by breakdown voltages of the Zener diodes 136a and 140a connected in parallel. That is, the Zener diodes 136a and 140a prevent that excessive current flows in the relay circuits 134a and 138a.

The feed line connecting circuit of the branching unit 116a is largely different from that of the branching unit 36a in the embodiment shown in FIG. 1 in that the feed line connecting terminals B1 and C1 disconnected from the central node O1 are connected to ground not directly but via the resistors 132a and 144a and in that it does not include a circuit for automatically maintaining connection of the feed line connecting terminal C1 to ground when such connection is established.

Behaviors of the feed line connecting terminal in the branching unit 116a are explained below. Under the unpowered condition, since the switches 132a and 142a contact at selective contacts a, all of the feed line connecting terminals A1, B1 and C1 result in being connected to each other at the central node O1. This enables insulation tests.

When connection between feed line connecting terminals A1 and B1 is desired, a plus potential is applied to the feed line connecting terminal A1 whereas a minus potential is applied to the feed line connecting terminal B1. Then, a current flows from the feed line connecting terminal A1 toward the feed line connecting terminal B1. Since this direction is the reverse direction for the Zener diode 136a, a maximum current regulated by the breakdown voltage of the Zener diode 136a flows in the relay circuit 134a and makes it change connection of the switch 142a to the selective contact b. As a result, the feed line connecting terminal C1 is disconnected from the central node O1, and connected to ground through the resistor 144a. In this status, power can be supplied to the power feeding line 122 independently from the power feeding lines 120 and 128 by applying a plus or minus potential to the terminal of the branch station 114 connected to the power feeding line 122.

When connection between the feed line connecting terminals A1 and C1 is desired, a plus potential is applied to the feed line connecting terminal A1 and a minus potential is applied to the feed line connecting terminal C1 from the unpowered condition. Under the unpowered condition, since the selective switch 142a connects at the selective contact a, a current flows in the relay circuit 128a. When a current over a predetermined value flows in the relay circuit 138a, it changes connection of the selective switch 132a to the selective contact b. As a result, the feed line connecting terminal B1 is disconnected from the central node O1 and connected to ground through the resistor 132a.

In the feed line connecting circuit of the branching unit 116a, the feed line connecting terminals B1 and C1 cannot be connected to each other.

Construction of the feed line connecting circuit of the branching unit 116b is explained below. The feed line connecting circuit of the branching unit 116b is similar to that of the branching unit 116a.

A feed line connecting terminal B2 directly connects to a central node O2 which connects to a selective contact a of the selective switch 130b. A selective contact b of the selective switch 130b is connected to ground through a resistor 132b, and a common contact c of the selective switch 130b is connected to a feed line connecting terminal A2 via parallel circuits of a relay circuit 134b and a Zener diode 136b. The selective switch 130b normally connects at the selective contact a. The Zener diode 136b is so connected that the direction from the central node O2 toward the feed line connecting terminal A2 be forward.

The central node O2 also connects to a selective contact a of a selective switch 142b through parallel circuits of a relay circuit 138b and a Zener diode 140b. A selective contact b of the selective switch 142b connects to ground through a resistor 144b, and a common contact c of the selective switch 142b connects to a feed line connecting terminal C2. The selective switch 142b normally connects at the selective contact a. The Zener diode 140b is so connected that the direction from the central node O2 toward the feed line connecting terminal C2 be forward.

The relay circuit 134b changes connection of the selective switch 142b to the selective contact b when a current above a predetermined value flows. The relay circuit 138b changes connection of the selective switch 132b to the selective contact b when a current over the predetermined value flows. Similarly to the Zener diodes 136a and 140a, the Zener diodes 136b and 140b prevent that an excessive current flows in the relay circuits 134b and 138b.

Behaviors of the feed line connecting circuit in the branching unit 116b are explained below. Under the unpowered condition, since the switches 130b and 142b connect at selective contacts a, all of the feed line connecting terminal A2, B2 and C2 result in being connected to each other at the central node O2.

When connection between the feed line connecting terminals A2 and B2 is desired, a plus potential is applied to the feed lien connecting terminal A2 and a minus potential is applied to the feed line connecting terminal B2 from the unpowered condition. Then, a current flows from the feed line connecting terminal A2 toward the feed line connecting terminal B2. Since an amply large current flows in the relay circuit 134b, it changes connection of the switch 142b to the selective contact b. As a result, the feed line connecting terminal C2 is disconnected from the central node O2 and connected to ground through the resistor 144b. In this status, power can be supplied to the power feeding line 124 independently from the power feeding lines 126 and 128 by applying a plus or minus potential to the terminal of the branching unit 114 connected to the power feeding line 124.

When connection between the feed line connecting terminals C2 and B2 is desired, a plus potential is applied to the feed line connecting terminal C2 and a minus potential is applied to the feed line connecting terminal B2 from the unpowered condition. Under the unpowered condition, since the selective switch 142b connects at the selective contact a, a current flows from the feed line connecting terminal C2 to the feed line connecting terminal B2 through the common contact c and selective contact a of the switch 142b and the relay circuit 138b. When a current over a predetermined value flows in the relay circuit 138b, the selective switch 130b changes connection to the selective contact b. As a result, the feed line connecting terminal A2 is disconnected from the central node O2 and connected to ground through the relay circuit 134b (or Zener diode 136b) and the resistor 132b.

In this manner, the embodiment shown here disconnects the feed line connecting terminal B1 of the branching unit 116a and the feed line connecting terminal A2 of the branching unit 116b from the central nodes O1 and O2 and connects them to ground through the resistors 132a and 132b, respectively. It results in connecting opposite ends of the power feeding line 128 to ground through the resistors 132a and 132b. In this status, if an open trouble occurs in the power feeding line 122, for example, no current flows in the relay circuit 138a in the branching unit 116a. Therefore, the connection of the selective switch 130a returns to the selective contact a, and the feed line connecting terminal B1 connects to the central node O1, i.e., the feed line connecting terminal A1. However, since the power feeding line 128 connected to the feed line connecting terminal B1 of the branching unit 116a connects to ground through the resistor 132b at its other end (feed line connecting terminal A2 of the branching unit 116b), it is prevented that an excessive voltage is applied to the relay circuits 134a and 134b even under the open trouble of the power feeding line 122.

Figure 8:
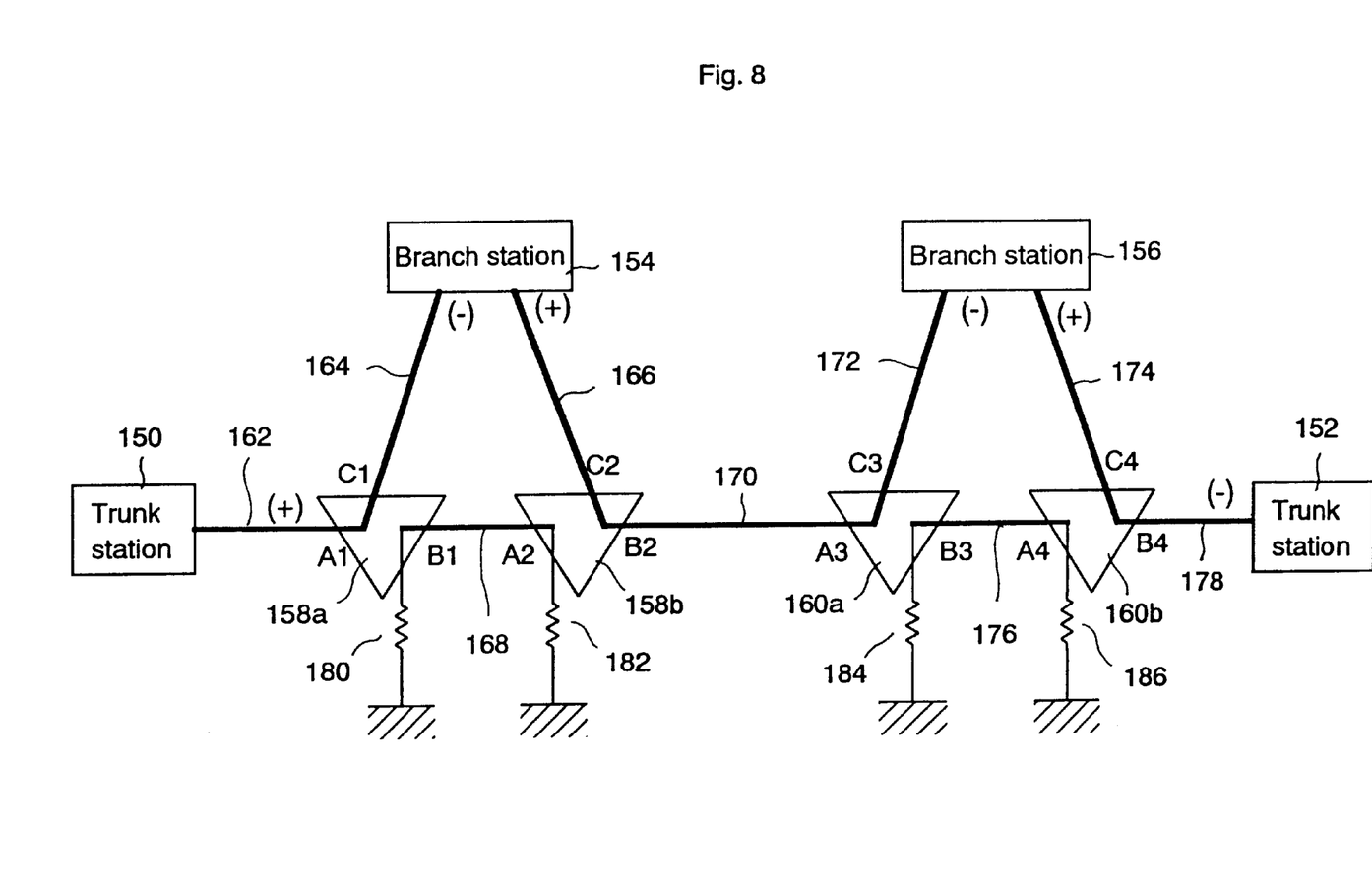
FIG. 8 is a diagram showing a power feeding configuration during normal power feeding in an optical transmission system using the embodiment shown in FIG. 7.

Next explained is the power feeding system established when the embodiment shown in FIG. 7 is used in an optical transmission system with two branch stations interposed between trunk stations. FIG. 8 shows the power feeding configuration under normal power feeding.

Numerals 150 and 152 denote trunk stations, 154 and 156 are branch stations, 158a and 158b are (feed line connecting circuits of) branching units for the branch station 154, and 160a and 160b are (feed line connecting circuits of) branching units for the branch station 156. In the branching units 158a and 160a, the feed line connecting circuit shown in the branching unit 116a of FIG. 7 is employed, whereas the feed line connecting circuit shown in the branching unit 116b in FIG. 7 is employed in the branching units 158b and 160b.

A power feeding line 162 is connected between the trunk station 150 and a feed line connecting terminal A1 of the branching unit 158a (corresponding to the feed line connecting terminal A1 of the branching unit 116a), a power feeding line 164 is connected between a feed line connecting terminal C1 of the branching unit 158a (corresponding to the feed line connecting terminal C1 of the branching unit 116a) and the branch station 154, a power feeding line 166 is connected between the branch station 154 and a feed line connecting terminal C2 of the branching unit 158b (corresponding to the feed line connecting terminal C2 of the branching unit 116b), and a power feeding line 168 is connected between a feed line connecting terminal B1 of the branching unit 158a (corresponding to the feed line connecting terminal B1 of the branching unit 116a) and a feed line connecting terminal A2 of the branching unit 158b (corresponding to the feed line connecting terminal A2 of the branching unit 116b).

A power feeding line 170 is connected between a feed line connecting terminal B2 of the branching unit 158b (corresponding to the feed line connecting terminal B2 of the branching unit 116b) and a feed line connecting terminal A3 of the branching unit 160a (corresponding to the feed line connecting terminal A1 of the branching unit 116a). A power feeding line 172 is connected between a feed line connecting terminal C3 of the branching unit 160a (corresponding to the feed line connecting terminal C1 of the branching unit 116a) and the branch station 156. A power feeding line 174 is connected between the branch station 156 and a feed line connecting terminal C4 of the branching unit 160b (corresponding to the feed line connecting terminal C2 of the branching unit 116b). A power feeding line 176 is connected between a feed line connecting terminal B3 of the branching unit 160a (corresponding to the feed line connecting terminal B1 of the branching unit 116a) and a feed line connecting terminal A4 of the branching unit 160b (corresponding to the feed line connecting terminal A2 of the branching unit 116b). A power feeding line 178 is connected between a feed line connecting terminal B4 of the branching unit 160a (corresponding to the feed line connecting terminal B2 of the branching unit 116b) and the trunk station 152.

In the normally powered condition, the power feeding lines 168 and 176 between adjacent branching units 158a, 158b and between adjacent branching units 160a 160b connected to the same branch stations 154, 156 are connected to ground at their opposite ends through high resistors 180, 182 184, 186 as explained with reference to FIG. 7.

Briefly explained below is a process for establishing the power feeding system shown in FIG. 8 from the unpowered condition. Under the unpowered condition, the feed line connecting terminals A1 through C1, A2 through C2, A3 through C3 and A4 through C4 of the branching units 158a, 158b, 160a and 160b are connected to each other, respectively, as explained before.

When the trunk station 150 applied a plus potential (or current) to the power feeding line 162 and the branch station 154 applies a minus potential (or current) to the power feeding line 164 while opening the connection points of the branch station 156 and trunk station 152 to the power feeding lines 172, 174 and 178, the feed line connecting terminals A1 and C1 of the branching unit 158a are connected to each other, and the feed line connecting terminal B1 is connected to sea ground via the resistor 180, as explained above.

After that, a plus current is applied from a constant current source built in the branch station 154 to the power feeding line 166, and a minus current is applied from a constant current source built in the branch station 156 to the power feeding line 172. In this case, quantities of the currents applied to the power feeding lines 166 and 172 are increased gradually or stepwise from zero, and the rising time of the constant current source and the speed of increasing the current is equalized between the branch stations 154 and 156. As a result, an equal current flows in the power feeding lines 166, 170 and 172, and due to the behavior of the relay circuits explained with reference to FIG. 7, in the branching unit 185b, the feed line connecting terminals B2 and C2 are connected to each other and the feed line connecting terminal A2 is connected to sea ground via the resistor 182 in the branching unit 158b; and in the branching unit 160a, the feed line connecting terminals A3 and C3 are connected to each other and the feed line connecting terminal B3 is connected to sea ground via the resistor 184.

Finally, a plus current is applied to the power feeding line 174 from a constant current source built in the branch station 156, and a minus current is applied to the power feeding line 178 from a constant current source built in the trunk station 152. In this case, quantities of the currents applied to the power feeding lines 174 and 178 are increased gradually or stepwise from zero, and the rising time of the constant current source and the speed of increasing the current are equalized between the branch station 156 and the trunk station 152. As a result, an equal current flows in the power feeding lines 174 and 178. When the current reaches a value enough to activate the relay circuits, due to behaviors of the relay circuits explained with reference to FIG. 7, in the branching unit 160b, the feed line connecting terminal C4 and B4 are connected to each other and the feed line connecting terminal A4 is connected to sea ground via the resistor 186.

In this manner, as shown in FIG. 8, the power feeding lines 162 through 178 are connected, and power feeding lines 168 and 176 between adjacent branching units 158a and 158b and between adjacent branching units 160a and 160b are connected to ground at their opposite ends via high resistors 180, 182, 184 and 186 corresponding to the resistors 132a and 132b.

Figure 9:
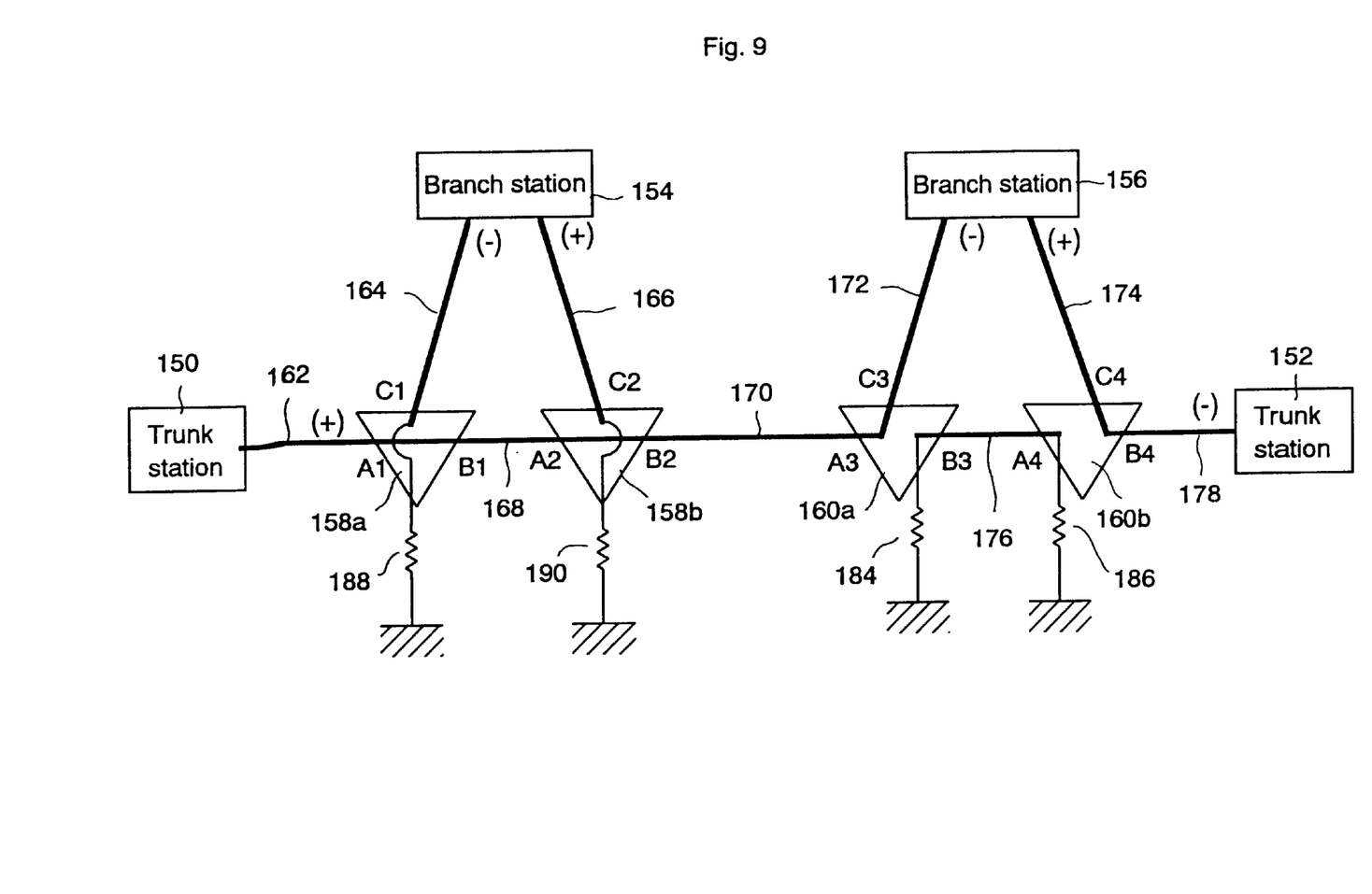
FIG. 9 is a schematic diagram showing a power feeding configuration established upon any trouble in a power feeding line 162 or 166 in the optical transmission system using the embodiment shown in FIG. 7.

If any trouble occurs in the power feeding line 164 or 166, for example, the power feeding system can be changed as shown in FIG. 9. At first, power feeding to the power feeding lines 162 and 166 from the branch station 154 is stopped, and connection points of the branch station 154 connected to the power feeding lines 162 and 166 are opened. As a result, in the branching unit 158a, the feed line connecting terminals A1, B1 and C1 are connected to each other; and in the branching unit 158b, the feed line connecting terminals A2, B2 and C2 are connected to each other. In this status, a plus current is applied to the power feeding line 162 from the constant current source built in the trunk station 150, and a minus current is applied to the power feeding line 172 from the constant current source built in the branch station 156. In this case, quantities of the currents applied to the power feeding lines 162 and 172 are increased gradually or stepwise from zero, and the rising time of the constant current source and the speed of increasing the current are equalized between the trunk stations 150 and the branch station 156.

As a result, an equal current flows in the power feeding lines 162, 168, 170 and 172. When the current reaches a value enough to activate the relay circuits, due to behaviors of the relay circuits explained with reference to FIG. 7, in the branching unit 158a, the feed line connecting terminals A1 and B1 are connected to each other and the feed line connecting terminal C1 is connected to sea ground via a resistor 188 corresponding to the resistor 132a; and in the branching unit 158b, the feed line connecting terminals A2 and B2 are connected to each other and the feed line connecting terminal C2 is connected to sea ground via a resistor 190 corresponding to the resistor 132b. By selecting small resistor values for the resistors 188 and 190, independent power feeding to the power feeding lines 162 and 166 as shown in FIG. 9 can be realized. It will be needless to say that power is not supplied to power feeding lines under trouble.

As described above, according to the invention, feed line connecting terminals currently disconnected can be held floating from ground or connected to ground via high resistors. As a result, it is prevented that useless current or excessive current flows in power feeding lines connected to the feed line connecting terminals. Moreover, when a power feeding line between two branching units in a double branching system is held floating from ground or connected to ground via high resistors at opposite ends thereof, it is prevented that a large current flows even when the configuration of connection of feed line connecting terminals automatically changes in any of the branching unit due to breakage of any of the power feeding lines.

What is claimed is:

1. A feed line connecting circuit for selectively connecting first, second and third line connecting terminals under a predetermined current feeding condition, comprising:
   - a first current detector connected between one of said first and second feed line connecting terminals and a central node for detecting a current over a first predetermined value;
   - a first switch connected between said one of the first and second feed line connecting terminals and said central node for connecting said one of the first and second feed line connecting terminals to said central node in an unpowered condition;
   - a selective switch controlled by said first current detector, the selective switch having first and second selective contacts and a common contact connected to said third feed line connecting terminal, the common contact being connected to the first selective contact when the first current detector does not detect a current over the first predetermined value, and to the second selective contact when the first current detector detects a current over the first predetermined value; and
   - a second current detector connected between said first selective contact of said selective switch and said central node to open said first switch to disconnect said one of the first and second feed line connecting terminals from said central node when detecting a current above a second predetermined value.

2. The feed line connecting circuit according to claim 1 wherein said first current detector and said first switch are connected between said second feed line connecting terminal and said central node.

3. The feed line connecting circuit according to claim 1 wherein said first current detector and said first switch are connected between said first feed line connecting terminal and said central node.

4. The feed line connecting circuit according to claim 1 wherein said second selective contact of said selective switch is connected to ground via a predetermined resistance value.

5. The feed line connecting circuit according to claim 1 wherein said second selective contact of said selective switch is connected to ground.

6. The feed line connecting circuit according to claim 1 further comprising a third current detector connected between said second selective contact of said selective switch and ground, a second switch connected between said first selective contact of said selective switch and said central node, said second switch being normally closed and opened when said third current detector detects a current above a third predetermined value, and a third switch connected between said common contact and said second selective contact of said selective switch, said third switch being normally opened and closed when said third current detector detects a current above the third predetermined value.

7. The feed line connecting circuit according to claim 1 further comprising a resistor connected between said first selective contact of said selective switch and said central node, and a second switch connected in parallel with said resistor, said second switch being closed by said second current detector when a current above the second predetermined value flows into said second current detector.

8. The feed line connecting circuit according to claim 1 further comprising a first bypass circuit connected in a parallel with said first detector, a second bypass circuit connected in parallel with the second current detector, and a third bypass circuit connected in parallel with the third current detector, each of said first, second, and third bypass circuits bypassing a current in a predetermined direction.

9. The feed line connecting circuit according to claim 8 wherein each of said bypass circuits comprises a Zener diode.

10. The feed line connecting circuit according to claim 1 wherein said first switch connects said one of the first and second feed line connecting terminals to ground through a resistor when said one of the first and second feed line connecting terminals is disconnected from said central node.

11. An optical transmission system including a branch station, first and second branching units, a power feeding line having a first end connected to said first branching unit and a second end connected to said second branching unit, each of the ends of the power feeding line being switchable between two positions in its respective branching unit, each of the positions floating from ground, and a trunk optical line connecting said first and second branching units to the branching station.

12. An optical transmission system including a branch station, first and second branching units, a power feeding line having a first end connected to said first branching unit and a second end connected to said second branching unit, each of the ends of the power feeding line being switchable between two positions in its respective branching unit, one of the positions in each of the branching units being connected to ground through a respective resistor, and a trunk optical line connecting said first and second branching units to the branching station.

* * * * *

UNITED STATES PATENT AND TRADEMARK OFFICE
CERTIFICATE OF CORRECTION

| | | |
|---|---|---|
| PATENT NO. | : 6,157,098 | Page 1 of 1 |
| DATED | : December 5, 2000 | |
| INVENTOR(S) and | : Junichi Kojima, Kenichi Asakawa, Koji Goto, Toshio Kawazawa, Koh-ichi Tatekura Etsuo Nazuka | |

It is certified that error appears in the above-identified patent and that said Letters Patent is hereby corrected as shown below:

<u>Title page, Item [54] and Column 1, line 1,</u>
The Title should read -- FEED LINE CONNECTING CIRCUIT AND OPTICAL TRANSMISSION SYSTEM --

Signed and Sealed this

Second Day of July, 2002

*Attest:*

JAMES E. ROGAN
*Attesting Officer*   *Director of the United States Patent and Trademark Office*